US009669630B2

(12) United States Patent
Yaginuma et al.

(10) Patent No.: US 9,669,630 B2
(45) Date of Patent: Jun. 6, 2017

(54) METHOD FOR MANUFACTURING LIQUID EJECTION HEAD

(71) Applicant: CANON KABUSHIKI KAISHA, Tokyo (JP)

(72) Inventors: Seiichiro Yaginuma, Kawasaki (JP); Keiji Matsumoto, Kawasaki (JP); Koji Sasaki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 14/479,079

(22) Filed: Sep. 5, 2014

(65) Prior Publication Data

US 2015/0068036 A1 Mar. 12, 2015

(30) Foreign Application Priority Data

Sep. 9, 2013 (JP) ................................ 2013-186086

(51) Int. Cl.

*B21D 53/76* (2006.01)
*B23P 17/00* (2006.01)
*B41J 2/16* (2006.01)

(52) U.S. Cl.

CPC ........... *B41J 2/1631* (2013.01); *B41J 2/1603* (2013.01); *B41J 2/1623* (2013.01); *B41J 2/1628* (2013.01); *B41J 2/1629* (2013.01); *B41J 2/1632* (2013.01); *B41J 2/1634* (2013.01); *B41J 2/1635* (2013.01); *B41J 2/1639* (2013.01); *B41J 2/1646* (2013.01); *Y10T 29/49401* (2015.01)

(58) Field of Classification Search

CPC .......... B41J 2202/19; B41J 2002/14362; B41J 2202/16; B41J 2/14024; Y10T 29/49401; Y10T 29/49126; Y10T 29/4913; Y10T 29/49155; H01L 21/3043

USPC ...... 29/890.1, 825, 831, 832, 835, 848, 851, 29/890.142; 347/20, 40, 42, 43, 54, 63, 347/65, 93

See application file for complete search history.

(56) References Cited

U.S. PATENT DOCUMENTS 4,638,337 A * 1/1987 Torpey ................ B41J 2/14129 347/65

FOREIGN PATENT DOCUMENTS

JP 4850637 B2 1/2012

* cited by examiner

*Primary Examiner* — Thiem Phan

(74) *Attorney, Agent, or Firm* — Canon U.S.A. Inc., IP Division

(57) ABSTRACT

A method for manufacturing liquid ejection heads includes the steps of forming ejection port members on a substrate, the ejection port members each having a liquid channel and an ejection port for ejecting liquid through the channel, the liquid channel communicating with the substrate; forming supply ports passing through the substrate to supply liquid to the channels; and forming a separation groove in the substrate to separate the substrate for each liquid ejection head. The step of forming the ejection port members includes the step of hardening a material constituting the ejection port member by heat treatment. The step of forming the separation groove is performed before the step of hardening.

16 Claims, 6 Drawing Sheets

METHOD FOR MANUFACTURING LIQUID EJECTION HEAD

BACKGROUND OF THE INVENTION

Field of the Invention

The present invention relates to a method for manufacturing liquid ejection heads.

Description of the Related Art

Japanese Patent No. 4850637 discloses a method for manufacturing a liquid ejection head in which ejection port members are formed with silicon. This method allows ejection port members to be formed with silicon using the etching selection ratio of porous silicon to monocrystalline silicon by forming a porous silicon area, bonding a substrate thereto, and thereafter processing it from the back of the substrate.

The inventors examined a method disclosed in Japanese Patent No. 4850637 and found that the method has a problem in that forming ejection port members with a material different from that of its substrate causes stress due to a difference in the coefficient of thermal expansion, thus causing defects, such as a crack, in the substrate.

SUMMARY OF THE INVENTION

The present invention provides a method for manufacturing liquid ejection heads in which propagation of defects in a substrate, if occurred, to another substrate can be prevented.

A method for manufacturing liquid ejection heads according to an aspect of the present invention includes the steps of forming ejection port members on a substrate, the ejection port members each having a liquid channel and an ejection port for ejecting liquid through the channel, the liquid channel communicating with the substrate; forming supply ports passing through the substrate to supply liquid to the channels; and forming a separation groove in the substrate to separate the substrate for each liquid ejection head. The step of forming the ejection port members includes the step of hardening a material constituting the ejection port members by heat treatment. The step of forming the separation groove is performed before the step of hardening.

Further features of the present invention will become apparent from the following description of exemplary embodiments with reference to the attached drawings.

DESCRIPTION OF THE EMBODIMENTS

A method for manufacturing liquid ejection heads according to an embodiment of the present invention includes the steps of forming ejection port members on a substrate, the ejection port members each having a liquid channel and an ejection port for ejecting liquid through the channel, the liquid channels communicating with the substrate; forming supply ports passing through the substrate to supply liquid to the channels; and forming a separation groove in the substrate to separate the substrate for each liquid ejection head. The step of forming the ejection port members includes the step of hardening a material constituting the ejection port members by heat treatment. The step of forming the separation groove is performed before the step of hardening.

Even if a material constituting the substrate and a material constituting the ejection port members differ from each other, so that stress occurs during heating due to a difference in the coefficient of thermal expansion, thus causing defects, such as a crack, in the substrate, a method according to an embodiment of the present invention can prevent propagation of the defects to another substrate, in which no defect is produced, by forming the separation groove in the substrate before the hardening during which the stress occurs, thus enhancing the quality of the obtained liquid ejection heads. Although embodiments of the present invention will now be described, the present invention is not limited thereto.

First Embodiment

Figure 1:
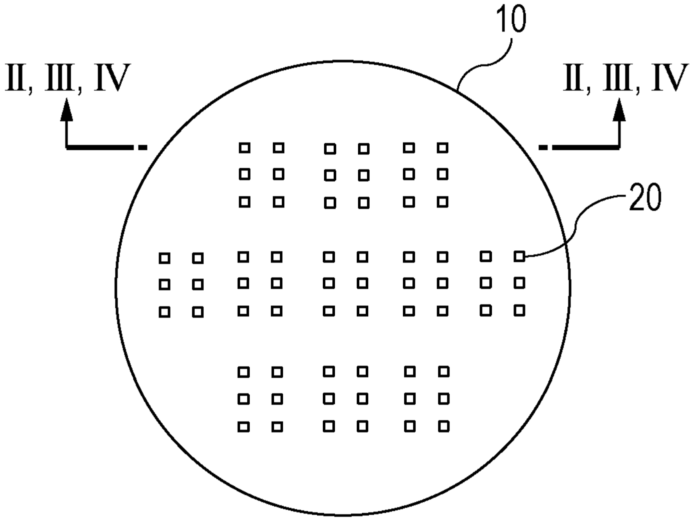
FIG. 1 is a top view of an example of a substrate according to an embodiment of the present invention.
Figure 2A:
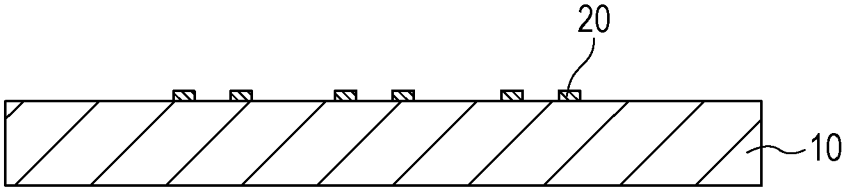
FIG. 2A is a cross sectional view of the substrate, illustrating an example method for manufacturing liquid ejection heads according to an embodiment of the present invention.
Figure 2B:
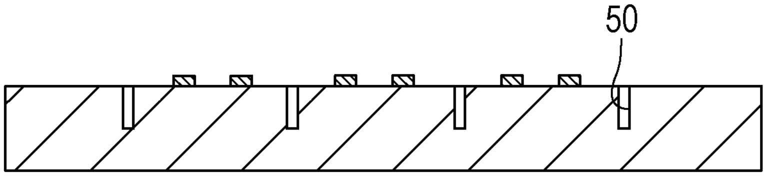
FIG. 2B is a cross sectional view of the substrate, illustrating the method for manufacturing liquid ejection heads according to the embodiment of the present invention.
Figure 2C:
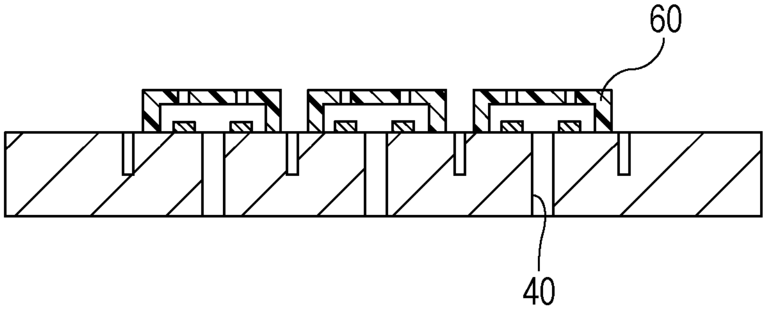
FIG. 2C is a cross sectional view of the substrate, illustrating the method for manufacturing liquid ejection heads according to the embodiment of the present invention.

A method for manufacturing liquid ejection heads according to a first embodiment will be described with reference to FIGS. 2A to 2C. FIGS. 2A to 2C are II-II cross sectional views of a substrate 10, shown in FIG. 1, including energy generating devices 20 that impart energy for ejecting liquid to the liquid, illustrating individual processes.

First, the substrate 10 including the energy generating devices 20 is prepared, as shown in FIG. 2A. Examples of a material for the substrate 10 include silicon, germanium, silicon carbide, gallium arsenide, indium arsenide, gallium phosphide, diamond, zinc oxide, which is an oxide semiconductor, indium nitride and gallium nitride, which are nitride semiconductors, and mixtures thereof. Among them, silicon can be used for the substrate 10 because a semiconductor manufacturing process therefore has been established. Other examples of the substrate 10 are a glass substrate and an aluminum oxide substrate on which a semiconductor thin film is formed and a silicon-on-insulator (SOI) substrate. Examples of the energy generating devices 20 include a heater device and a piezoelectric device. The substrate 10 may have a drive circuit for the energy generating devices 20.

Next, a separation groove 50 is formed in the substrate 10, as shown in FIG. 2B. The separation groove 50 can be formed with a laser beam or a blade or by sandblasting, dry etching, wet etching, or the like. An optimum processing method may be selected because the shape of the separation groove 50 depends on its processing method. For example, a processing method using a laser beam forms process marks in the substrate 10, thus sometimes causing a heat-affected layer or debris. A processing method using a short-pulse laser beam with a pulse width of the order of femtosecond can reduce generation of a heat-affected layer. Using a combination of a water jet and a laser beam can significantly reduce generation of a heat-affected layer and debris in a processed surface. A processing method using a blade forms cut marks. A sandblasting processing method causes characteristic roughness. With a wet etching processing method, isotropic etching causes an isotropically etched shape, and anisotropic etching causes a shape affected by a difference in etching rate depending on the surface orientation. With a dry etching processing method, a bosch process causes a characteristic step shape. Combinations of these processing methods may be used.

Figure 5A:
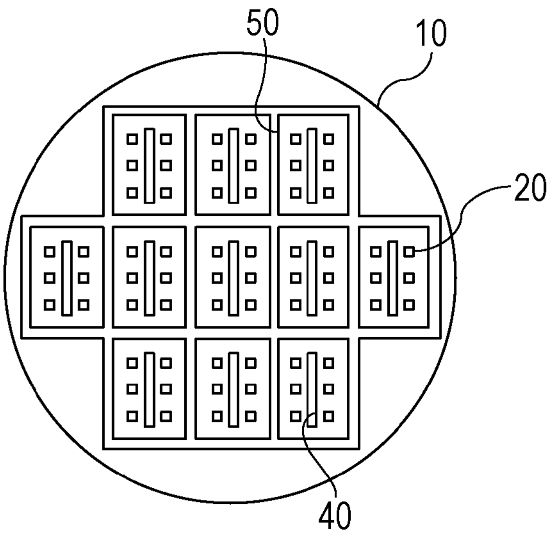
FIG. 5A is a top view of an example of a separation groove formed in the substrate according to an embodiment of the present invention.
Figure 5B:
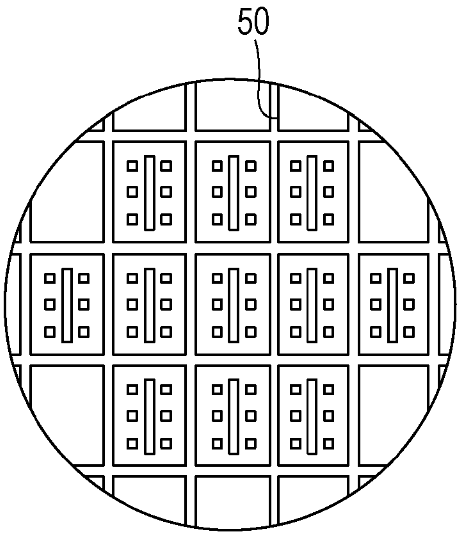
FIG. 5B is a top view of an example of a separation groove formed in the substrate according to an embodiment of the present invention.
Figure 5C:
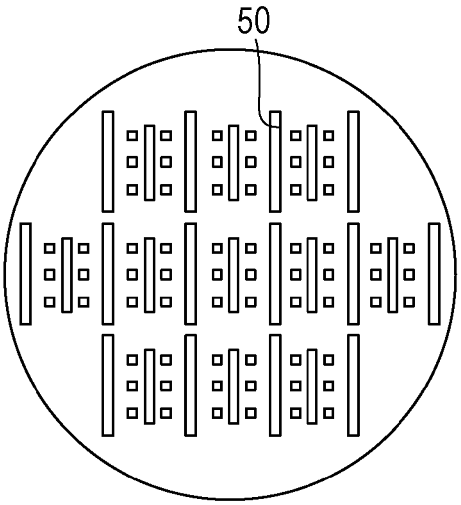
FIG. 5C is a top view of an example of a separation groove formed in the substrate according to an embodiment of the present invention.

The separation groove 50 may be formed in the substrate 10 from a surface on which ejection port members are to be formed so that the dimension accuracy of portions where ejection ports and supply ports communicate increases. Although the size of the separation groove 50 is not particularly limited, the width of the separation groove 50 is preferably set in the range of 1 μm to 1000 μm from the viewpoint of efficiently preventing propagation of defects. The depth of the separation groove 50 is preferably 50 μm or more. The separation groove 50 may be formed of any of straight lines, curves, and dotted lines, or may be include a plurality of grooves. The separation groove 50 may be formed in such a manner as to enclose the individual liquid ejection heads, as shown in FIG. 5A, may be formed in such a manner as to enclose individual liquid ejection heads and to extend to the end of the substrate 10, as shown in FIG. 5B, or may be formed in part of the individual liquid ejection heads, as shown in FIG. 5C.

Next, supply ports 40 and ejection port members 60 are formed, as shown in FIG. 2C. Either of the supply ports 40 and the ejection port members 60 may be formed first. If the substrate 10 is made of silicon, the supply ports 40 can be formed by anisotropic etching using a tetramethylammonium hydroxide (TMAH) solution or the like. If the ejection port members 60 have already been formed, the ejection port members 60 are coated with a protective film, and then the supply ports 40 are formed by anisotropic etching. A material for the ejection port members 60 may be photosensitive resin in the viewpoint of processing accuracy. Examples of the photosensitive resin include photosensitive epoxy resin, photosensitive polyimide, photosensitive polyamide, photosensitive acrylic resin, and photosensitive urethane. One or more of them may be used. The ejection port members 60 can be formed by the following method, for example. The substrate 10 is coated with positive photosensitive acrylic resin and is then subjected to photolithographic patterning to form a mold for channels. The mold is coated with negative photosensitive epoxy resin constituting the ejection port members 60 and is subjected to patterning to form ejection ports in the ejection port members 60. The mold can be removed later by dissolution. The ejection port members 60 may be coated with a water-repellent material.

In the first embodiment, the process of forming the supply ports 40 and the process of forming the separation groove 50 are performed separately. These processes may be performed in the same process from the viewpoint of reducing the number of processes. Forming the supply ports 40 and the separation groove 50 in the same process translates into forming the supply ports 40 and the separation groove 50 simultaneously by, for example, soaking the substrate 10 in an etchant. The separation groove 50 and the supply ports 40 may not necessarily be completed at the same time.

Next, the process of hardening the material for the ejection port members 60 by heat treatment is performed. The process of forming the ejection port members 60 sometimes includes a plurality of heat-treatment processes. In the present invention, a final heat-treatment process for hardening the material for the ejection port members 60 is defined as the process of hardening. As described above, the process of hardening generates stress due to a difference in thermal expansion ratio between the material for the substrate 10 and the material for the ejection port members 60, making the substrate 10 prone to defects, such as a crack. A method according to an embodiment of the present invention can prevent propagation of the defects because the substrate 10 already has the separation groove 50 at the process of hardening. Examples of a method for heat treatment include heating methods using a hot plate, an oven, and electromagnetic waves. Examples of an atmosphere for heat treatment include the air, nitrogen, oxygen, water vapor, and a vacuum. The temperature and time for heat treatment are not particularly limited provided that the material for the ejection port members 60 can be sufficiently hardened; however, the ejection port members 60 are preferably, subjected to heat treatment at 100° C. to 260° C. for 10 minutes to 20 hours in the viewpoint of preventing occurrence of defects.

Next, the substrate 10 is cut for each liquid ejection head. The substrate 10 may be cut by a method of dicing with a blade, a laser beam, or plasma. The substrate 10 may be cut inside the separation groove 50 in the viewpoint of preventing chipping. The inside of the separation groove 50 refers to portions of the bottom faces in the separation groove 50 not including lines in contact with the side surfaces. Cutting the bottom faces of the separation groove 50 without shaving the side surfaces can prevent chipping of the corners of the separation groove 50. The substrate 10 can be cut inside the separation groove 50 by dicing with a blade. Steps are formed around the outer peripheries of the individual heads by cutting the substrate 10 inside the separation groove 50, which sometimes offers the advantages of enhancing adhesiveness with an adhesive agent or sealing agent and preventing a wraparound in a mounting process. Alternatively, the substrate 10 may be cut by reducing the thickness of the substrate 10 from the surface opposite to the surface in which the separation groove 50 is formed from the viewpoint of preventing chipping. The thickness of the substrate 10 may be reduced by polishing or etching.

Thus, the liquid ejection heads according to the first embodiment are completed.

Second Embodiment

A method for manufacturing liquid ejection heads according to a second embodiment will be described with reference to FIGS. 3A to 3E. FIGS. 3A to 3E are III-III cross sectional views of the substrate 10 including the energy generating devices 20 shown in FIG. 1, illustrating individual processes.

Figure 3A:
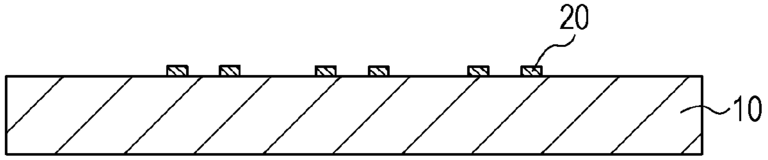
FIG. 3A is a cross sectional view of the substrate, illustrating an example method for manufacturing liquid ejection heads according to an embodiment of the present invention.

First, as shown in FIG. 3A, the substrate 10 including the energy generating devices 20 is prepared, as in the first embodiment.

Figure 3B:
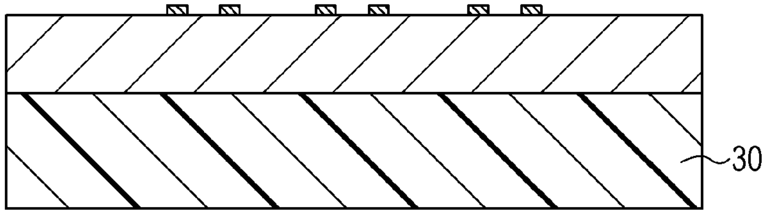
FIG. 3B is a cross sectional view of the substrate, illustrating the method for manufacturing liquid ejection heads according to the embodiment of the present invention.

Next, a supporting member 30 is formed on the substrate 10, as shown in FIG. 3B. Forming the supporting member 30 on the substrate 10 can prevent the substrate 10 from being separated when the substrate 10 is subjected to through-hole processing. This can also straighten the warp of the substrate 10 to facilitate handling and can increase the strength. Furthermore, using a material having high thermal conductivity for the supporting member 30 improves the heat dissipation and the uniformity of the temperature. Examples of a material for the supporting member 30 include resin, ceramics, metal, and semiconductors. Examples of a material for the supporting member 30 include resins, such as polyethylene terephthalate (PET), polyurethane (PU), polyimide (PI), polyamide (PA), polycarbonate (PC), polyphenylenether (PPE), epoxy resin, fluororesin, and acrylic resin, ceramics, such as carbon graphite, glass, aluminum oxide, and aluminum nitride, metals, such as stainless steel, aluminum, copper, and iron, and semiconductors, such as silicon and silicon carbide. One or more of them may be used. The supporting member 30 may either be one layer or be composed of two layers.

The substrate 10 and the supporting member 30 may be subjected to a plasma treatment of a priming treatment in the viewpoint of enhancing the adherence therebetween. For bonding the supporting member 30, an adhesive agent, such as of a thermosetting type, a photo-setting type, or a moisture-reactive type, or low-melting-point metal. Alternatively, an adhesive film of a thermal ablation type, a photoablation type, or a force ablation type may be used. Alternatively, thermal welding, ultrasonic welding, or surface activated bonding using plasma or an ion beam may be used to bond the supporting member 30. The substrate 10 may be provided with a material for bonding with the supporting member 30. The surface of the substrate 10 may be flat. Alternatively, the supporting member 30 may be formed by application, evaporation, chemical vapor deposition (CVD), or plating to the substrate 10. Alternatively, a supporting member 30 provided with holes or grooves may be bonded to the substrate 10. The supporting member 30 may have a circuit, and the circuit and a circuit on the substrate 10 may be joined together.

Figure 3C:
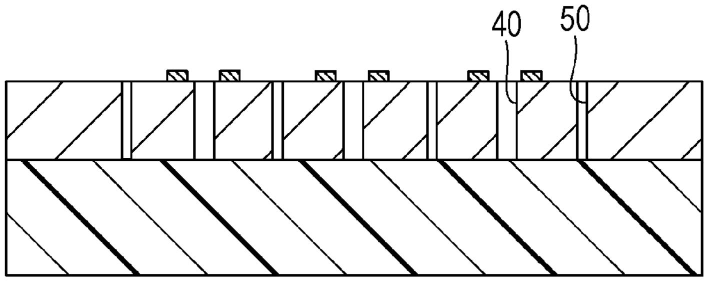
FIG. 3C is a cross sectional view of the substrate, illustrating the method for manufacturing liquid ejection heads according to the embodiment of the present invention.

Next, the supply ports 40 and the separation groove 50 are formed, as shown in FIG. 3C. At that time, the supply ports 40 and the separation groove 50 are formed in such a manner as to pass through the substrate 10 and not to pass through the supporting member 30. The joint portion of the substrate 10 and the supporting member 30 sometimes has notching due to overetching. The supply ports 40 and the separation groove 50 can be formed by the same method as that of the first embodiment. The processed shape differs depending on the etching selection ratio of the substrate 10 to the supporting member 30. A difference in opening width between the supply ports 40 and the separation groove 50 sometimes causes a difference in shape due to a difference in etching rate. The supply ports 40 and the separation groove 50 may be formed in the same process in the viewpoint of reducing the number of working processes. The substrate 10 may be decreased in thickness before this process. The decrease in the thickness of the substrate 10 reduces the time for through-hole processing and produces the effect of reducing leakage of current from the driving element and enhancing radiation resistance.

Figure 3D:
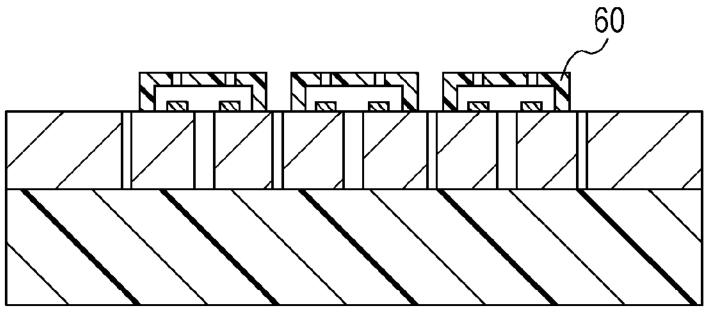
FIG. 3D is a cross sectional view of the substrate, illustrating the method for manufacturing liquid ejection heads according to the embodiment of the present invention.

Next, the ejection port members 60 are formed, as shown in FIG. 3D. A method for forming the ejection port members 60 is not particularly limited; an example method is as follows: First, a dry film made of negative photosensitive epoxy resin is laminated on the substrate 10 and is subjected to photolithographic patterning to form channels. A dry film made of negative photosensitive epoxy resin is laminated thereon and is subjected to photolithographic patterning to form ejection ports, thereby forming the ejection port members 60. The ejection port members 60 may be coated with a water-repellent material.

After the above process, the supporting member 30 is separated from the substrate 10 to complete the liquid ejection heads. Thus, the number of working processes can be reduced. Part of all of the above processes may be changed in sequence. If the through-hole processing on the substrate 10 and the supporting member 30 is performed after the ejection port members 60 are formed, a protective film is generally formed to prevent damage to the ejection port members 60. Thus, the process of forming the protective film can be omitted by, for example, forming the ejection port members 60 after the supporting member 30 is subjected to through-hole processing. If the substrate 10 and the supporting member 30 are subjected to through-hole processing first, a durability enhancing film or the like can easily be formed inside the supply ports 40 and on the surface of the substrate 10, so that the durability of the liquid ejection heads can be enhanced.

Figure 3E:
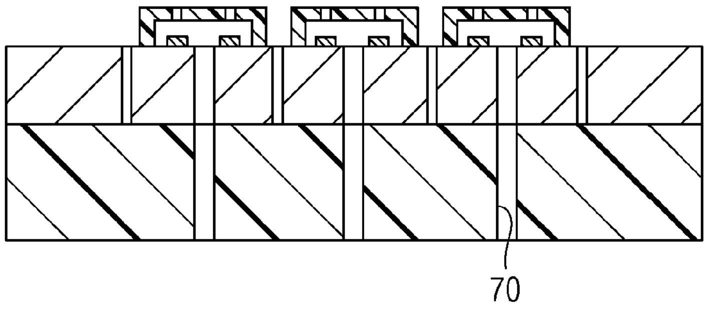
FIG. 3E is a cross sectional view of the substrate, illustrating the method for manufacturing liquid ejection heads according to the embodiment of the present invention.

Next, second supply ports 70 are formed in the supporting member 30, as shown in FIG. 3E. The second supply ports 70 can be formed with a laser beam or a blade or by sand blasting, dry etching, wet etching, or wet end milling. Forming the second supply ports 70 in the supporting member 30 to use the supporting member 30 as part of the components of the liquid ejection heads allows handling with great strength, thus reducing a decrease in quality. The process of forming through-holes in the supporting member 30 may be performed before the process in FIG. 3B or between the process in FIG. 3B and the process in FIG. 3C, or may be omitted. If the process of forming through-holes in the supporting member 30 is omitted, the liquid ejection heads may be formed, with the supporting member 30 separated from the substrate 10.

Subsequently, the process of hardening and the process of cutting the substrate 10 are performed, as in the first embodiment, to complete the liquid ejection heads according to the second embodiment.

The supporting member 30 may be formed on either side of the substrate 10, for example, a front surface of the ejection port members 60 after the ejection port members 60 are formed. It is also possible to form a first supporting member on one surface of the substrate 10, form through-holes in the substrate 10 and cut the substrate 10, thereafter form a second supporting member on the other surface of the substrate 10, and remove the first supporting member. Alternatively, the substrate 10 and the energy generating devices 20 may be formed on the supporting member 30 by deposition.

Third Embodiment

A method for manufacturing liquid ejection heads according to a third embodiment will be described with reference to FIGS. 4A to 4E. FIGS. 4A to 4E are IV-IV cross sectional views of the substrate 10 including the energy generating devices 20 shown in FIG. 1, illustrating individual processes.

Figure 4A:
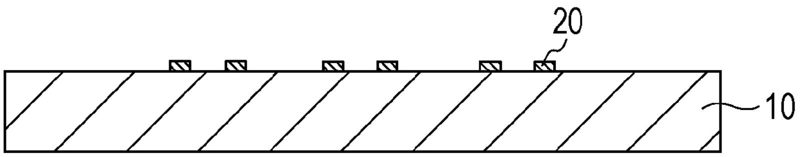
FIG. 4A is a cross sectional view of the substrate, illustrating an example method for manufacturing liquid ejection heads according to an embodiment of the present invention.
Figure 4B:
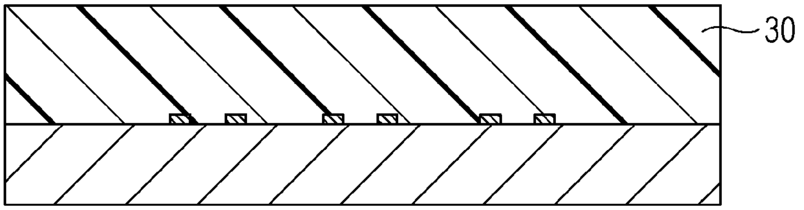
FIG. 4B is a cross sectional view of the substrate, illustrating the method for manufacturing liquid ejection heads according to the embodiment of the present invention.

First, as shown in FIG. 4A, the substrate 10 including the energy generating devices 20 is prepared as in the first embodiment. Next, the supporting member 30 is formed on a surface of the substrate 10 on which the energy generating devices 20 is disposed, as shown in FIG. 4B. The supporting member 30 can be formed as in the second embodiment.

Figure 4C:
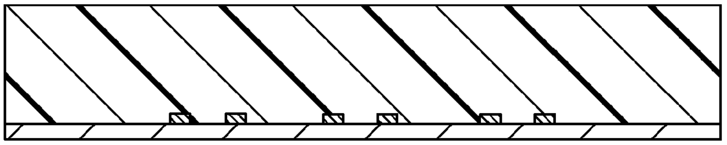
FIG. 4C is a cross sectional view of the substrate, illustrating the method for manufacturing liquid ejection heads according to the embodiment of the present invention.

Next, the substrate 10 is reduced in thickness, as shown in FIG. 4C. The thickness of the substrate 10 can be reduced by, for example, polishing, chemical mechanical polishing (CMP), dry etching, wet etching, or a combination thereof. Alternatively, the reduction in thickness may be performed by forming a hydrogen injected layer or a porous layer on the substrate 10 and thereafter peeling it off. This process may be performed before the supporting member 30 is formed, shown in FIG. 4B. In this case, a first supporting member is formed, and the substrate 10 is reduced in thickness, and thereafter, it may be transferred to the second supporting member. Planarizing the surface in which the ejection port members 60 are formed in this process offers the advantage of increasing the flexibility of the processing accuracy and the thickness of the ejection port members 60. Furthermore, reducing the thickness of the substrate 10 before the process of forming the separation groove 50, described later, allows the separation groove 50 to be formed in a short time in the process of forming the separation groove 50.

Figure 4D:
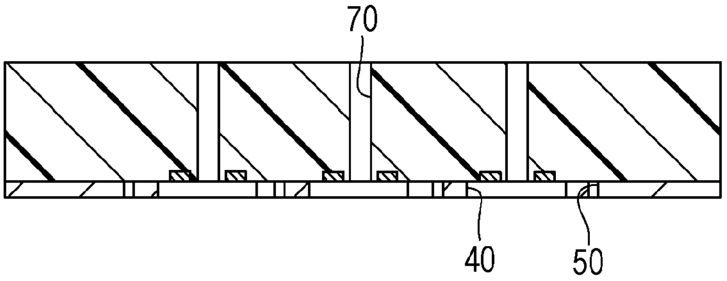
FIG. 4D is a cross sectional view of the substrate, illustrating the method for manufacturing liquid ejection heads according to the embodiment of the present invention.
Figure 6A:
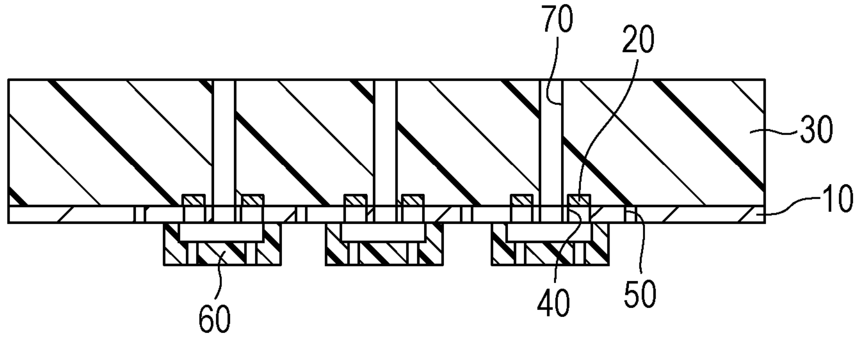
FIG. 6A is a cross sectional view of an example of liquid ejection heads according to an embodiment of the present invention.
Figure 6B:
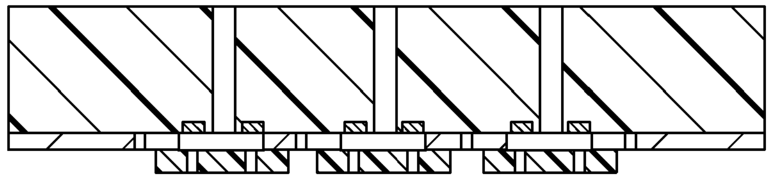
FIG. 6B is a cross sectional view of an example of liquid ejection heads according to an embodiment of the present invention.
Figure 6C:
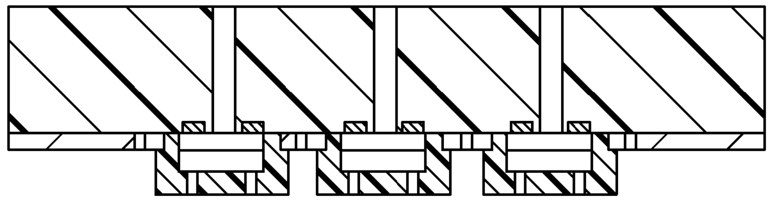
FIG. 6C is a cross sectional view of an example of liquid ejection heads according to an embodiment of the present invention.

Next, the supply ports 40, the separation groove 50, and the second supply ports 70 are formed, as shown in FIG. 4D. They can be formed by the same method as in the first and second embodiments. If the supply ports 40 and the separation groove 50 are to be formed in the same process, the substrate 10 may be left in such a manner as to enclose the energy generating devices 20, as shown in FIG. 6A, to enhance energy transmission efficiency to liquid. Furthermore, as shown in FIG. 6B, forming a pattern that serves also as a liquid channel in the substrate 10 can reduce the number of processes for forming the ejection port members 60. Furthermore, as shown in FIG. 6C, forming the ejection port members 60 such that the substrate 10 is not in contact with liquid enhances the durability. A protective film may be formed to obtain the above advantage.

Figure 4E:
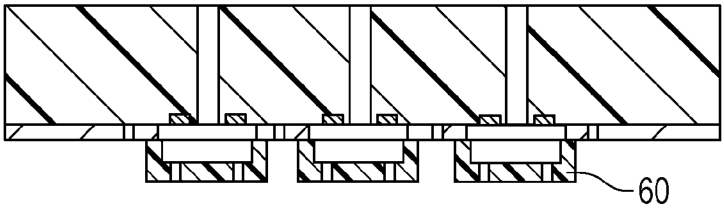
FIG. 4E is a cross sectional view of the substrate, illustrating the method for manufacturing liquid ejection heads according to the embodiment of the present invention.

Next, as shown in FIG. 4E, the ejection port members 60 are formed by the same method as in the first and second embodiments. Thereafter, the process of hardening and the process of cutting the substrate 10 are performed as in the first and second embodiments to complete the liquid ejection heads according to the third embodiment.

EXAMPLES

Although examples of the present invention are shown below, the present invention is not limited thereto.

Example 1

Referring to FIGS. 2A to 2C, a method for manufacturing liquid ejection heads of this example will be described. First, the substrate 10 having a thickness of 725 μm shown in FIG. 2A was prepared. The substrate 10 was made of silicon, on which the energy generating devices 20 for ejecting liquid, which are heater devices, were provided. Next, as shown in FIG. 2B, the separation groove 50 (width: 20 μm, depth: 350 μm) were formed in the substrate 10 with a laser beam. Next, as shown in FIG. 2C, the ejection port members 60 and the supply ports 40 were formed. Specifically, the substrate 10 was coated with positive photosensitive acrylic resin and was then subjected to photolithographic patterning to form a mold for the channels. The mold was coated with negative photosensitive epoxy resin (product name: EHPE-3150, manufactured by Daicel Corporation) constituting the ejection port members 60, was then coated with a water-repellent material, and was then subjected to patterning to form ejection ports in the ejection port members 60.

The ejection port members 60 was coated with cyclized rubber serving as a protective film, and then the supply ports 40 was formed in the substrate 10 by anisotropic etching using a tetramethylammonium hydroxide solution. Thereafter, a film (not shown) in the openings of the supply ports 40, the film constituting a drive circuit for the energy generating devices 20, was removed. The cyclized rubber serving as the protective film was removed, and the mold was also removed. Next, the negative photosensitive epoxy resin that constitutes the ejection port members 60 was hardened by heat treatment at 180° C. in an oven with nitrogen atmosphere for two hours. Subsequently, the substrate 10 was cut inside the separation groove 50 with a blade to separate the liquid ejection heads from each other. Thus, the liquid ejection heads were completed. With the method of this example, defects in the substrate 10, such as cracking, if generated, did not propagate to the substrate 10 of another liquid ejection head.

Example 2

Referring to FIGS. 3A to 3E, a method for manufacturing liquid ejection heads of this example will be described. First, the same substrate 10 as that in example 1 was prepared, as shown in FIG. 3A. Next, as shown in FIG. 3B, the supporting member 30 made of epoxy resin was bonded to the surface of the substrate 10 opposite to the surface on which the energy generating devices 20 are disposed via an adhesive agent made of thermosetting epoxy resin. Next, as shown in FIG. 3C, the supply ports 40 and the separation groove 50 (width: 120 μm, depth: 750 μm) were formed. Specifically, a resist mask was formed on the surface of the substrate 10 on which the energy generating devices 20 are disposed and was processed by dry etching to form the supply ports 40 and the separation groove 50 in the same process. The supply ports 40 and the separation groove 50 were formed in such a manner as to pass through the substrate 10 and not to pass through the supporting member 30.

Next, as shown in FIG. 3D, the ejection port members 60 were formed. Specifically, first, a dry film made of negative photosensitive epoxy resin was laminated on the substrate 10 and was subjected to photolithographic patterning to form channels. A dry film made of negative photosensitive epoxy resin was laminated thereon, was coated with a water-repellent material, and was subjected photolithographic patterning to form ejection ports. Next, as shown in FIG. 3E, the second supply ports 70 communicating with the supply ports 40 were formed in the supporting member 30 by end milling. Next, the negative photosensitive epoxy resin constituting the ejection port members 60 was hardened by heat treatment at 150° C. in an oven with nitrogen atmosphere for three hours. Subsequently, the substrate 10 was cut inside the separation groove 50 with a blade to separate the liquid ejection heads from each other. Thus, the liquid ejection heads were completed. With the method of this example, defects in the substrate 10, such as cracking, if generated, did not propagate to the substrate 10 of another liquid ejection head.

Example 3

Referring to FIGS. 4A to 4E, a method for manufacturing liquid ejection heads of example 3 will be described. First, the same substrate 10 as that in example 1 was prepared, as shown in FIG. 4A. Next, as shown in FIG. 4B, the supporting member 30 was formed on the surface of the substrate 10 on which the energy generating devices 20 are disposed. Specifically, a barrier layer made of tantalum and a plating seed layer made of copper were formed on the substrate 10 by sputtering. Furthermore, a copper layer was formed thereon by electroplating and was planarized by chemical mechanical planarization (CMP). The planarized copper layer and other copper were bonded by surface activated bonding to form the supporting member 30. The use of a material having high thermal conductivity, such as copper, as a material for the supporting member 30 enhances the heat dissipation performance to offer the advantage of keeping the temperature of the substrate 10 constant. Next, as shown in FIG. 4C, the thickness of the substrate 10 was reduced by chemical mechanical planarization.

Next, as shown in FIG. 4D, the supply ports 40 and the separation groove 50 (width: 30 μm, depth: 80 μm) were formed by dry etching in the same process. Furthermore, the second supply ports 70 communicating with the supply ports 40 were formed in the supporting member 30 with a combination of water jets and a laser beam. Next, as shown in FIG. 4E, the ejection port members 60 were formed. Specifically, a dry film made of negative photosensitive epoxy resin was laminated on the substrate 10, and a channel pattern was exposed to light. A dry film made of high sensitivity negative photosensitive epoxy resin was laminated thereon without development, was coated with a water-repellent material, and an ejection port pattern was exposed to light. Subsequently, they were simultaneously developed to form the ejection port members 60. Next, they were subjected to heat treatment at 200° C. in an oven with nitrogen atmosphere for one hours to harden the negative photosensitive epoxy resin constituting the ejection port members 60. Subsequently, the substrate 10 is cut inside the separation groove 50 by laser ablation to separate the liquid ejection heads from each other. Thus, the liquid ejection heads were completed. With the method of this example, defects in the substrate 10, such as cracking, if generated, did not propagate to the substrate 10 of another liquid ejection head.

Example 4

Referring to FIGS. 3A to 4D, a method for manufacturing liquid ejection heads of example 4 will be described. First, the same substrate 10 as that in example 1 was prepared, as shown in FIG. 3A. Next, as shown in FIG. 3B, the supporting member 30, which is a polyimide adhesive film, was boned to the surface of the substrate 10 opposite to the surface on which the energy generating devices 20 are disposed. Next, as shown in FIG. 3C, the supply ports 40 and the separation groove 50 (width: 100 μm, depth: 750 μm) were formed in the same process by dry etching. Next, as shown in FIG. 3D, the ejection port members 60 were formed by the same method as that in example 3. Next, the negative photosensitive epoxy resin constituting the ejection port members 60 was hardened by heat treatment at 130° C. in an oven with nitrogen atmosphere for five hours. Subsequently, the substrate 10 and the supporting member 30 were separated from each other. Thus, the liquid ejection heads were completed. With the method of this example, defects in the substrate 10, such as cracking, if generated, did not propagate to the substrate 10 of another liquid ejection head. Furthermore, since formation of the supply ports 40 and cutting of the substrate 10 can be performed in the same process, the number of working processes could be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-186086 filed Sep. 9, 2013, which is hereby incorporated by reference herein in its entirety.

What is claimed is:

1. A method for manufacturing liquid ejection heads, comprising the steps of:

forming ejection port members on a substrate, the ejection port members each having a liquid channel and an ejection port for ejecting liquid through the liquid channel, the liquid channel communicating with the substrate;

forming supply ports passing through the substrate to supply liquid to the channels;

forming a separation groove in the substrate to separate the substrate for each liquid ejection head, wherein the step of forming the ejection port members includes the step of hardening a material constituting the ejection port members by heat treatment; and the step of forming the separation groove is performed before the step of hardening; and forming a supporting member on the substrate, the supporting member having high thermal conductivity to uniformly dissipate heat, wherein, the supply ports and the separation groove are formed to pass through the substrate and not to pass through the supporting member.

2. The method for manufacturing liquid ejection heads according to claim 1, wherein in the step of forming the separation groove, the separation groove is formed in the substrate by processing the substrate from a surface on which the ejection port members are to be formed.

3. The method for manufacturing liquid ejection heads according to claim 1, wherein the step of forming the supply ports and the step of forming the separation groove are performed in a same process.

4. The method for manufacturing liquid ejection heads according to claim 1, further comprising the step of cutting the substrate for each liquid ejection head, wherein, in the step of cutting the substrate, the substrate is cut inside the separation groove.

5. The method for manufacturing liquid ejection heads according to claim 1, further comprising the step of cutting the substrate for each liquid ejection head, wherein, in the step of cutting the substrate, the substrate is cut by reducing the thickness of the substrate from a surface of the substrate opposite to the surface on which the separation groove is formed.

6. The method for manufacturing liquid ejection heads according to claim 1, further comprising the step of forming a supporting member on the substrate, wherein, in the step of forming the separation groove, the separation groove is formed in such a manner as to pass through the substrate and not to pass through the supporting member.

7. The method for manufacturing liquid ejection heads according to claim 6, further comprising the step of reducing the thickness of the substrate before the step of forming the separation groove.

8. The method for manufacturing liquid ejection heads according to claim 6, wherein the substrate has thereon an energy generating device that imparts energy for ejecting liquid to the liquid;

the step of forming the supply ports and the step of forming the separation groove are performed in a same process; and in the same process, the substrate is left in such a manner as to enclose the energy generating device.

9. The method for manufacturing liquid ejection heads according to claim 6, further comprising the step of separating the substrate and the supporting member from each other after the step of hardening.

10. The method for manufacturing liquid ejection heads according to claim 6, further comprising the step of forming second supply ports in the supporting member, the second supply ports communicating with the supply ports.

11. The method for manufacturing liquid ejection heads according to claim 1, wherein a material constituting the substrate and the material constituting the ejection port members differ from each other.

12. The method for manufacturing liquid ejection heads according to claim 1, wherein the supporting member includes at least one of resin, ceramic, metal, and semiconductor.

13. The method for manufacturing liquid ejection heads according to claim 12, wherein the resin is at least one of polyethylene terephthalate, polyurethane, polyimide, polyamide, polycarbonate, polyphenylenether, epoxy resin, fluororesin, and acrylic resin.

14. The method for manufacturing liquid ejection heads according to claim 12, wherein the ceramic is at least one of carbon graphite, glass, aluminum oxide, and aluminum nitride.

15. The method for manufacturing liquid ejection heads according to claim 12, wherein the metal is at least one of stainless steel, aluminum, copper, and iron.

16. The method for manufacturing liquid ejection heads according to claim 12, wherein the semiconductor is at least one of silicon and silicon carbide.

* * * * *